(12) United States Patent
Charbonneau

(10) Patent No.: US 9,533,906 B2
(45) Date of Patent: Jan. 3, 2017

(54) BURNER APPARATUS, SUBMERGED COMBUSTION MELTERS INCLUDING THE BURNER, AND METHODS OF USE

(71) Applicant: JOHNS MANVILLE, Denver, CO (US)

(72) Inventor: Mark William Charbonneau, Lakewood, CO (US)

(73) Assignee: Johns Manville, Denver, CO (US)

( * ) Notice: Subject to any disclaimer, the term of this patent is extended or adjusted under 35 U.S.C. 154(b) by 73 days.

(21) Appl. No.: 14/486,797

(22) Filed: Sep. 15, 2014

(65) Prior Publication Data

US 2015/0000344 A1    Jan. 1, 2015

Related U.S. Application Data

(62) Division of application No. 13/268,028, filed on Oct. 7, 2011, now Pat. No. 8,875,544.

(51) Int. Cl.
    *C03B 5/235*       (2006.01)
    *C03B 5/18*        (2006.01)
           (Continued)

(52) U.S. Cl.
    CPC .............. *C03B 5/2356* (2013.01); *C03B 5/18* (2013.01); *C03B 5/2353* (2013.01); *F23D 11/108* (2013.01); *F23D 11/12* (2013.01); *F23D 11/36* (2013.01); *F23D 11/38* (2013.01); *F23D 14/20* (2013.01); *F23D 14/32* (2013.01); *F23D 14/48* (2013.01); *F23D 14/58* (2013.01);

(Continued)

(58) Field of Classification Search
None
See application file for complete search history.

(56) References Cited

U.S. PATENT DOCUMENTS 1,716,433 A    6/1929   Ellis
2,174,533 A   10/1939   See et al.
(Continued)

FOREIGN PATENT DOCUMENTS

DE     196 19 919 A1    8/1997
DE     100 29 983 C2    9/2003
(Continued)

OTHER PUBLICATIONS

Furman, BJ, ME 120 Experimental Methods Vibration Measurement, San Jose University Department of Mechanical and Aerospace Engineering, Nov. 2005.
(Continued)

*Primary Examiner* — Lisa Herring
(74) *Attorney, Agent, or Firm* — Robert D. Touslee

(57) ABSTRACT

Apparatus includes a first and second conduits configured to form an annulus between them. An adjustable structure includes a body having an upper surface, a lower surface, and a circumferential surface abutting a portion of the internal surface of the second conduit. The structure is adjustable axially in relation to and removably attached to the first conduit via a hub. The hub defines a central passage for fuel or oxidant. The body has one or more non-central through passages configured such that flow of an oxidant or fuel therethrough causes the fuel or oxidant to intersect flow of fuel or oxidant exiting from the central passage in a region above the upper surface of the body.

8 Claims, 7 Drawing Sheets

(51) Int. Cl.
*F23D 14/32* (2006.01)
*F23D 11/10* (2006.01)
*F23D 11/12* (2006.01)
*F23D 11/36* (2006.01)
*F23D 11/38* (2006.01)
*F23D 14/20* (2006.01)
*F23D 14/48* (2006.01)
*F23D 14/58* (2006.01)
*F23D 14/78* (2006.01)
*F23D 14/64* (2006.01)

(52) U.S. Cl.
CPC ............ *F23D 14/64* (2013.01); *F23D 14/78* (2013.01); *C03B 2211/23* (2013.01); *C03B 2211/60* (2013.01); *F23D 2900/00006* (2013.01); *Y02E 20/344* (2013.01); *Y10T 137/87249* (2015.04)

(56) References Cited

U.S. PATENT DOCUMENTS

| | | |
|---|---|---|
| 2,118,479 A | 1/1940 | McCaskey |
| 2,269,459 A | 1/1942 | Kleist |
| 2,432,942 A | 12/1947 | See et al. |
| 2,455,907 A | 1/1948 | Slayter |
| 2,679,749 A | 6/1954 | Poole |
| 2,718,096 A | 9/1955 | Henry et al. |
| 2,773,545 A | 12/1956 | Petersen |
| 2,781,756 A | 2/1957 | Kobe |
| 2,878,644 A | 3/1959 | Fenn |
| 2,890,166 A | 6/1959 | Heinze |
| 2,902,029 A | 9/1959 | Hill |
| 2,981,250 A | 4/1961 | Stewart |
| 3,020,165 A | 2/1962 | Davis |
| 3,056,283 A | 10/1962 | Tiede |
| 3,073,683 A | 1/1963 | Switzer et al. |
| 3,084,392 A | 4/1963 | Labino |
| 3,088,812 A | 5/1963 | Bitterlich et al. |
| 3,104,947 A | 9/1963 | Switzer et al. |
| 3,160,578 A | 12/1964 | Saxton et al. |
| 3,165,452 A | 1/1965 | Williams |
| 3,170,781 A | 2/1965 | Keefer |
| 3,174,820 A | 3/1965 | See et al. |
| 3,215,189 A | 11/1965 | Bauer |
| 3,224,855 A | 12/1965 | Plumat |
| 3,237,929 A | 3/1966 | Plumat et al. |
| 3,241,548 A | 3/1966 | See et al. |
| 3,248,205 A | 4/1966 | Dolf et al. |
| 3,260,587 A | 7/1966 | Dolf et al. |
| 3,268,313 A | 8/1966 | Burgman et al. |
| 3,285,834 A | 11/1966 | Guerrieri et al. |
| 3,294,512 A | 12/1966 | Penberthy |
| 3,325,298 A | 6/1967 | Brown |
| 3,385,686 A | 5/1968 | Plumat et al. |
| 3,402,025 A | 9/1968 | Garrett et al. |
| 3,407,805 A | 10/1968 | Bougard |
| 3,407,862 A | 10/1968 | Mustian, Jr. |
| 3,432,399 A | 3/1969 | Schutt |
| 3,445,214 A | 5/1969 | Oremesher |
| 3,498,779 A | 3/1970 | Hathaway |
| 3,510,393 A | 5/1970 | Burgman et al. |
| 3,525,674 A | 8/1970 | Barnebey |
| 3,533,770 A | 10/1970 | Adler et al. |
| 3,563,683 A | 2/1971 | Hess |
| 3,592,151 A | 7/1971 | Webber |
| 3,592,623 A | 7/1971 | Shepherd |
| 3,606,825 A | 9/1971 | Johnson |
| 3,617,234 A | 11/1971 | Hawkins et al. |
| 3,627,504 A | 12/1971 | Johnson et al. |
| 3,692,017 A | 9/1972 | Glachant et al. |
| 3,717,139 A | 2/1973 | Guillet et al. |
| 3,738,792 A | 6/1973 | Feng |
| 3,746,527 A | 7/1973 | Knavish et al. |
| 3,747,588 A | 7/1973 | Booth |
| 3,754,879 A | 8/1973 | Phaneuf |
| 3,756,800 A | 9/1973 | Phaneuf |
| 3,763,915 A | 10/1973 | Perry et al. |
| 3,764,287 A | 10/1973 | Brocious |
| 3,771,988 A | 11/1973 | Starr |
| 3,818,893 A | 6/1974 | Kataoka et al. |
| 3,835,909 A | 9/1974 | Douglas et al. |
| 3,840,002 A | 10/1974 | Douglas et al. |
| 3,856,496 A | 12/1974 | Nesbitt et al. |
| 3,885,945 A | 5/1975 | Rees et al. |
| 3,907,585 A | 9/1975 | Francel et al. |
| 3,913,560 A | 10/1975 | Lazarre et al. |
| 3,951,635 A | 4/1976 | Rough |
| 3,976,464 A | 8/1976 | Wardlaw |
| 4,001,001 A | 1/1977 | Knavish et al. |
| 4,004,903 A | 1/1977 | Daman et al. |
| 4,083,711 A | 4/1978 | Jensen |
| 4,110,098 A | 8/1978 | Mattmuller |
| 4,153,438 A | 5/1979 | Stream |
| 4,185,982 A | 1/1980 | Schwenninger |
| 4,203,761 A | 5/1980 | Rose |
| 4,205,966 A | 6/1980 | Horikawa |
| 4,226,564 A | 10/1980 | Takahashi et al. |
| 4,238,226 A | 12/1980 | Sanzenbacher et al. |
| 4,249,927 A | 2/1981 | Fukuzaki et al. |
| 4,270,740 A | 6/1981 | Sanzenbacher et al. |
| 4,282,023 A | 8/1981 | Hammel et al. |
| 4,303,435 A | 12/1981 | Sleighter |
| 4,323,718 A | 4/1982 | Buhring et al. |
| 4,349,376 A | 9/1982 | Dunn et al. |
| 4,406,683 A | 9/1983 | Demarest |
| 4,413,882 A | 11/1983 | Bailey et al. |
| 4,488,537 A | 12/1984 | Laurent |
| 4,539,034 A | 9/1985 | Hanneken |
| 4,542,106 A | 9/1985 | Sproull |
| 4,545,800 A | 10/1985 | Won et al. |
| 4,626,199 A | 12/1986 | Bounini |
| 4,632,687 A | 12/1986 | Kunkle et al. |
| 4,634,461 A | 1/1987 | Demarest, Jr. et al. |
| 4,657,586 A | 4/1987 | Masterson et al. |
| 4,735,642 A | 4/1988 | Jensen et al. |
| 4,738,938 A | 4/1988 | Kunkle et al. |
| 4,758,259 A | 7/1988 | Jensen |
| 4,798,616 A | 1/1989 | Knavish et al. |
| 4,814,387 A | 3/1989 | Donat |
| 4,816,056 A | 3/1989 | Tsai et al. |
| 4,877,436 A | 10/1989 | Sheinkop |
| 4,877,449 A * | 10/1989 | Khinkis ............... C01B 25/027 266/185 |
| 4,878,829 A | 11/1989 | Anderson |
| 4,882,736 A | 11/1989 | Pieper |
| 4,919,700 A | 4/1990 | Pecoraro et al. |
| 4,927,886 A | 5/1990 | Backderf et al. |
| 4,953,376 A | 9/1990 | Merlone |
| 5,032,230 A | 7/1991 | Shepherd |
| 5,052,874 A | 10/1991 | Johanson |
| 5,062,789 A | 11/1991 | Gitman |
| 5,097,802 A | 3/1992 | Clawson |
| 5,168,109 A | 12/1992 | Backderf et al. |
| 5,169,424 A | 12/1992 | Grinnen et al. |
| 5,199,866 A | 4/1993 | Joshi et al. |
| 5,204,082 A | 4/1993 | Schendel |
| 5,299,929 A | 4/1994 | Yap |
| 5,360,171 A | 11/1994 | Yap |
| 5,374,595 A | 12/1994 | Dumbaugh et al. |
| 5,405,082 A | 4/1995 | Brown et al. |
| 5,449,286 A | 9/1995 | Snyder et al. |
| 5,483,548 A | 1/1996 | Coble |
| 5,490,775 A | 2/1996 | Joshi et al. |
| 5,522,721 A | 6/1996 | Drogue et al. |
| 5,545,031 A | 8/1996 | Joshi et al. |
| 5,575,637 A | 11/1996 | Slavejkov et al. |
| 5,595,703 A | 1/1997 | Swaelens et al. |
| 5,606,965 A | 3/1997 | Panz et al. |
| 5,613,994 A | 3/1997 | Muniz et al. |
| 5,615,668 A | 4/1997 | Panz et al. |
| 5,636,623 A | 6/1997 | Panz et al. |
| 5,672,827 A | 9/1997 | Jursich |
| 5,713,668 A | 2/1998 | Lunghofer et al. |

(56) References Cited

U.S. PATENT DOCUMENTS

| | | |
|---|---|---|
| 5,718,741 A | 2/1998 | Hull et al. |
| 5,736,476 A | 4/1998 | Watzke et al. |
| 5,743,723 A | 4/1998 | Iatrides et al. |
| 5,765,964 A | 6/1998 | Calcote et al. |
| 5,814,121 A | 9/1998 | Travis |
| 5,829,962 A | 11/1998 | Drasek et al. |
| 5,833,447 A | 11/1998 | Bodelin et al. |
| 5,849,058 A | 12/1998 | Takeshita et al. |
| 5,863,195 A | 1/1999 | Feldermann |
| 5,944,507 A | 8/1999 | Feldermann |
| 5,944,864 A | 8/1999 | Hull et al. |
| 5,954,498 A | 9/1999 | Joshi et al. |
| 5,975,886 A | 11/1999 | Philippe |
| 5,979,191 A | 11/1999 | Jian |
| 5,984,667 A | 11/1999 | Philippe et al. |
| 5,993,203 A | 11/1999 | Koppang |
| 6,029,910 A | 2/2000 | Joshi et al. |
| 6,036,480 A | 3/2000 | Hughes et al. |
| 6,039,787 A | 3/2000 | Edlinger |
| 6,045,353 A | 4/2000 | VonDrasek et al. |
| 6,068,468 A | 5/2000 | Philippe et al. |
| 6,071,116 A | 6/2000 | Philippe et al. |
| 6,074,197 A | 6/2000 | Philippe |
| 6,077,072 A | 6/2000 | Marin et al. |
| 6,085,551 A | 7/2000 | Pieper et al. |
| 6,109,062 A | 8/2000 | Richards |
| 6,113,389 A | 9/2000 | Joshi et al. |
| 6,116,896 A | 9/2000 | Joshi et al. |
| 6,120,889 A | 9/2000 | Turner et al. |
| 6,123,542 A | 9/2000 | Joshi et al. |
| 6,126,438 A | 10/2000 | Joshi et al. |
| 6,154,481 A | 11/2000 | Sorg et al. |
| 6,156,285 A | 12/2000 | Adams et al. |
| 6,171,100 B1 | 1/2001 | Joshi et al. |
| 6,183,848 B1 | 2/2001 | Turner et al. |
| 6,210,151 B1 | 4/2001 | Joshi et al. |
| 6,210,703 B1 | 4/2001 | Novich |
| 6,237,369 B1 | 5/2001 | LeBlanc et al. |
| 6,241,514 B1 | 6/2001 | Joshi et al. |
| 6,244,197 B1 | 6/2001 | Coble |
| 6,244,857 B1 | 6/2001 | VonDrasek et al. |
| 6,247,315 B1 | 6/2001 | Marin et al. |
| 6,250,136 B1 | 6/2001 | Igreja |
| 6,250,916 B1 | 6/2001 | Philippe et al. |
| 6,274,164 B1 | 8/2001 | Novich |
| 6,276,924 B1 | 8/2001 | Joshi et al. |
| 6,276,928 B1 | 8/2001 | Joshi et al. |
| 6,293,277 B1 | 9/2001 | Panz et al. |
| 6,314,760 B1 | 11/2001 | Chenoweth |
| 6,314,896 B1 | 11/2001 | Marin et al. |
| 6,338,337 B1 | 1/2002 | Panz et al. |
| 6,344,747 B1 | 2/2002 | Lunghofer et al. |
| 6,357,264 B1 | 3/2002 | Richards |
| 6,386,271 B1 | 5/2002 | Kawamoto et al. |
| 6,418,755 B2 | 7/2002 | Chenoweth |
| 6,422,041 B1 | 7/2002 | Simpson et al. |
| 6,454,562 B1 | 9/2002 | Joshi et al. |
| 6,460,376 B1 | 10/2002 | Jeanvoine et al. |
| 6,536,651 B2 | 3/2003 | Ezumi et al. |
| 6,558,606 B1 | 5/2003 | Kulkarni et al. |
| 6,660,106 B1 | 12/2003 | Babel et al. |
| 6,694,791 B1 | 2/2004 | Johnson et al. |
| 6,701,617 B2 | 3/2004 | Li et al. |
| 6,705,118 B2 | 3/2004 | Simpson et al. |
| 6,708,527 B1 | 3/2004 | Ibarlucea et al. |
| 6,711,942 B2 | 3/2004 | Getman et al. |
| 6,715,319 B2 | 4/2004 | Barrow et al. |
| 6,722,161 B2 | 4/2004 | LeBlanc |
| 6,736,129 B1 | 5/2004 | Sjith |
| 6,739,152 B2 | 5/2004 | Jeanvoine et al. |
| 6,796,147 B2 | 9/2004 | Borysowicz et al. |
| 6,797,351 B2 | 9/2004 | Kulkarni et al. |
| 6,854,290 B2 | 2/2005 | Hayes et al. |
| 6,857,999 B2 | 2/2005 | Jeanvoine |
| 6,883,349 B1 | 4/2005 | Jeanvoine |
| 6,918,256 B2 | 7/2005 | Gutmark et al. |
| 7,027,467 B2 | 4/2006 | Baev et al. |
| 7,116,888 B1 | 10/2006 | Aitken et al. |
| 7,134,300 B2 | 11/2006 | Hayes et al. |
| 7,168,395 B2 | 1/2007 | Engdahl |
| 7,175,423 B1 | 2/2007 | Pisano et al. |
| 7,231,788 B2 | 6/2007 | Karetta et al. |
| 7,273,583 B2 | 9/2007 | Rue et al. |
| 7,383,698 B2 | 6/2008 | Ichinose et al. |
| 7,392,668 B2 | 7/2008 | Adams et al. |
| 7,428,827 B2 | 9/2008 | Maugendre et al. |
| 7,441,686 B2 | 10/2008 | Odajima et al. |
| 7,448,231 B2 | 11/2008 | Jeanvoine et al. |
| 7,454,925 B2 | 11/2008 | DeAngelis et al. |
| 7,509,819 B2 | 3/2009 | Baker et al. |
| 7,578,988 B2 | 8/2009 | Jacques et al. |
| 7,581,948 B2 | 9/2009 | Borders et al. |
| 7,622,677 B2 | 11/2009 | Barberree et al. |
| 7,624,595 B2 | 12/2009 | Jeanvoine et al. |
| 7,748,592 B2 | 7/2010 | Koga et al. |
| 7,767,606 B2 | 8/2010 | McGinnis et al. |
| 7,778,290 B2 | 8/2010 | Sacks et al. |
| 7,781,562 B2 | 8/2010 | Crawford et al. |
| 7,802,452 B2 | 9/2010 | Borders et al. |
| 7,832,365 B2 | 11/2010 | Hannum et al. |
| 7,845,314 B2 | 12/2010 | Smith |
| 7,855,267 B2 | 12/2010 | Crawford et al. |
| 8,033,254 B2 | 10/2011 | Hannum et al. |
| 8,279,899 B2 | 10/2012 | Kitabayashi |
| 8,285,411 B2 | 10/2012 | Hull et al. |
| 8,707,739 B2 | 4/2014 | Huber et al. |
| 8,707,740 B2 | 4/2014 | Huber et al. |
| 8,875,544 B2 | 11/2014 | Charbonneau |
| 2002/0086077 A1 | 7/2002 | Noller et al. |
| 2002/0134112 A1 | 9/2002 | Barrow et al. |
| 2002/0152770 A1 | 10/2002 | Becher et al. |
| 2002/0162358 A1 | 11/2002 | Jeanvoine et al. |
| 2002/0166343 A1 | 11/2002 | LeBlanc |
| 2003/0015000 A1 | 1/2003 | Hayes et al. |
| 2003/0029197 A1 | 2/2003 | Jeanvoine et al. |
| 2003/0037571 A1 | 2/2003 | Kobayashi et al. |
| 2004/0131988 A1 | 7/2004 | Baker et al. |
| 2004/0168474 A1 | 9/2004 | Jeanvoine et al. |
| 2004/0224833 A1 | 11/2004 | Jeanvoine et al. |
| 2005/0039491 A1 | 2/2005 | Maugendre et al. |
| 2005/0103323 A1 | 5/2005 | Engdahl |
| 2005/0236747 A1* | 10/2005 | Rue ............... C03B 5/2356 266/217 |
| 2006/0000239 A1 | 1/2006 | Jeanvoine et al. |
| 2006/0174655 A1 | 8/2006 | Kobayashi et al. |
| 2006/0233512 A1 | 10/2006 | Aitken et al. |
| 2006/0257097 A1 | 11/2006 | Aitken et al. |
| 2006/0287482 A1 | 12/2006 | Crawford et al. |
| 2006/0293494 A1 | 12/2006 | Crawford et al. |
| 2006/0293495 A1 | 12/2006 | Crawford et al. |
| 2007/0106054 A1 | 5/2007 | Crawford et al. |
| 2007/0122332 A1 | 5/2007 | Jacques et al. |
| 2007/0130994 A1 | 6/2007 | Boratav et al. |
| 2007/0212546 A1 | 9/2007 | Jeanvoine et al. |
| 2007/0220922 A1 | 9/2007 | Bauer et al. |
| 2008/0035078 A1 | 2/2008 | Li |
| 2008/0227615 A1 | 9/2008 | McGinnis et al. |
| 2008/0256981 A1 | 10/2008 | Jacques et al. |
| 2008/0276652 A1 | 11/2008 | Bauer et al. |
| 2008/0293857 A1 | 11/2008 | Crawford et al. |
| 2009/0042709 A1 | 2/2009 | Jeanvoine et al. |
| 2009/0220899 A1 | 9/2009 | Spangelo et al. |
| 2010/0064732 A1 | 3/2010 | Jeanvoine et al. |
| 2010/0087574 A1 | 4/2010 | Crawford et al. |
| 2010/0089383 A1 | 4/2010 | Cowles |
| 2010/0120979 A1 | 5/2010 | Crawford et al. |
| 2010/0143601 A1 | 6/2010 | Hawtof et al. |
| 2010/0227971 A1 | 9/2010 | Crawford et al. |
| 2010/0236323 A1 | 9/2010 | D'Angelico et al. |
| 2010/0300153 A1 | 12/2010 | Zhang et al. |
| 2010/0304314 A1 | 12/2010 | Rouchy et al. |
| 2010/0307196 A1 | 12/2010 | Richardson |
| 2010/0326137 A1 | 12/2010 | Rouchy et al. |
| 2011/0054091 A1 | 3/2011 | Crawford et al. |

(56) References Cited

U.S. PATENT DOCUMENTS

| | | |
|---|---|---|
| 2011/0061642 A1 | 3/2011 | Rouchy et al. |
| 2011/0088432 A1 | 4/2011 | Purnode et al. |
| 2011/0107670 A1 | 5/2011 | Galley et al. |
| 2011/0236846 A1 | 9/2011 | Rue et al. |
| 2013/0086944 A1 | 4/2013 | Shock et al. |
| 2013/0086951 A1 | 4/2013 | Charbonneau et al. |
| 2013/0086952 A1 | 4/2013 | Charbonneau et al. |
| 2013/0283861 A1 | 10/2013 | Mobley et al. |
| 2013/0327092 A1 | 12/2013 | Charbonneau |

FOREIGN PATENT DOCUMENTS

| | | |
|---|---|---|
| DE | 10 2005 033330 B3 | 8/2006 |
| EP | 0 181 248 B1 | 10/1989 |
| EP | 1337789 B1 | 12/2004 |
| EP | 1 990 321 A1 | 11/2008 |
| EP | 2 133 315 A1 | 12/2009 |
| EP | 1986966 B1 | 4/2010 |
| EP | 1667934 B1 | 2/2011 |
| FR | 2 740 860 A1 | 9/1997 |
| GB | 191301772 | 0/1914 |
| GB | 191407633 | 0/1914 |
| GB | 164073 | 5/1921 |
| IT | 1208172 | 7/1989 |
| RO | 114827 | 7/1999 |
| WO | 9855411 A1 | 12/1998 |
| WO | 2008103291 A1 | 8/2008 |
| WO | 2009091558 A1 | 7/2009 |
| WO | 2010011701 A2 | 1/2010 |
| WO | 2010045196 A2 | 4/2010 |

OTHER PUBLICATIONS

Higley, BA, Glass Melter System Technologies for Vitrification of High-Sodium Content Low-Level, Radioactive, Liquid Wastes—Phase I: SBS Demonstration With Simulated Low-Level Waste—Final Test Report, Westinghouse Hanford Company, Sep. 1995.

Report for Treating Hanford LAW and WTP SW Simulants: Pilot Plant Mineralizing Flowsheet Apr. 2009, Department of Energy Environmental Management Consolidated Business Center by THOR Treatment Technologies, LLC.

Olabin, V.M. et al, "Submerged Combustion Furnace for Glass Melts," Ceramic Engineering and Science Proceedings, Jan. 1, 1996, pp. 84-92, vol. 17—No. 2, American Ceramic Society Inc., US.

"Glass Industry of the Future", United States Department of Energy, report 02-GA50113-03, pp. 1-17, Sep. 30, 2008.

"Glass Melting Technology—A Technical and Economic Assessment", 2004, U.S. Department of Energy, pp. 1-292.

\* cited by examiner

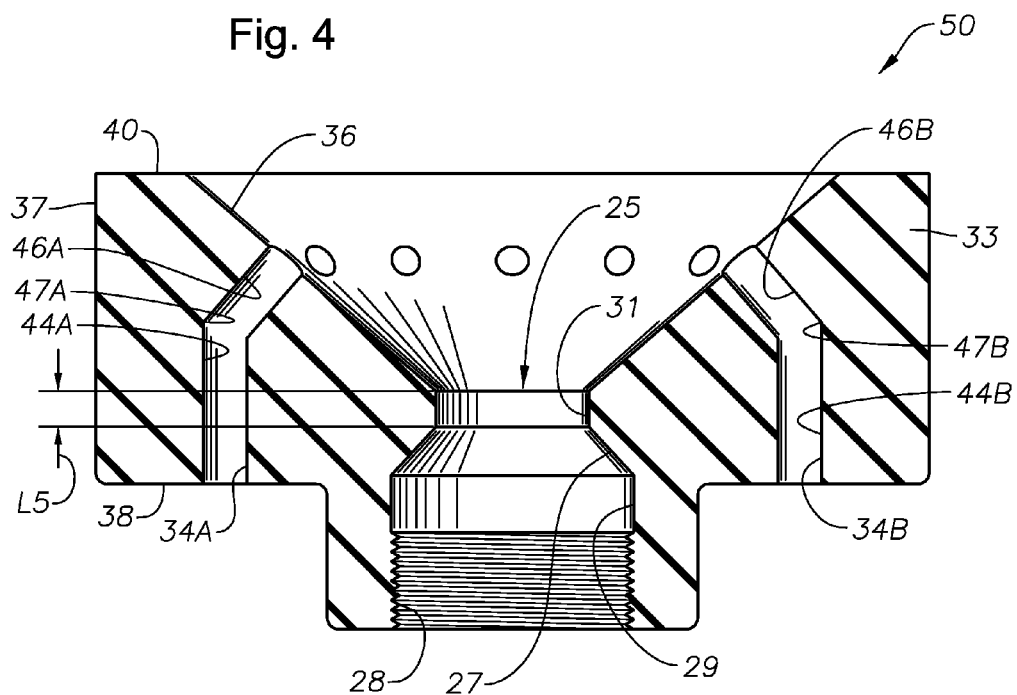
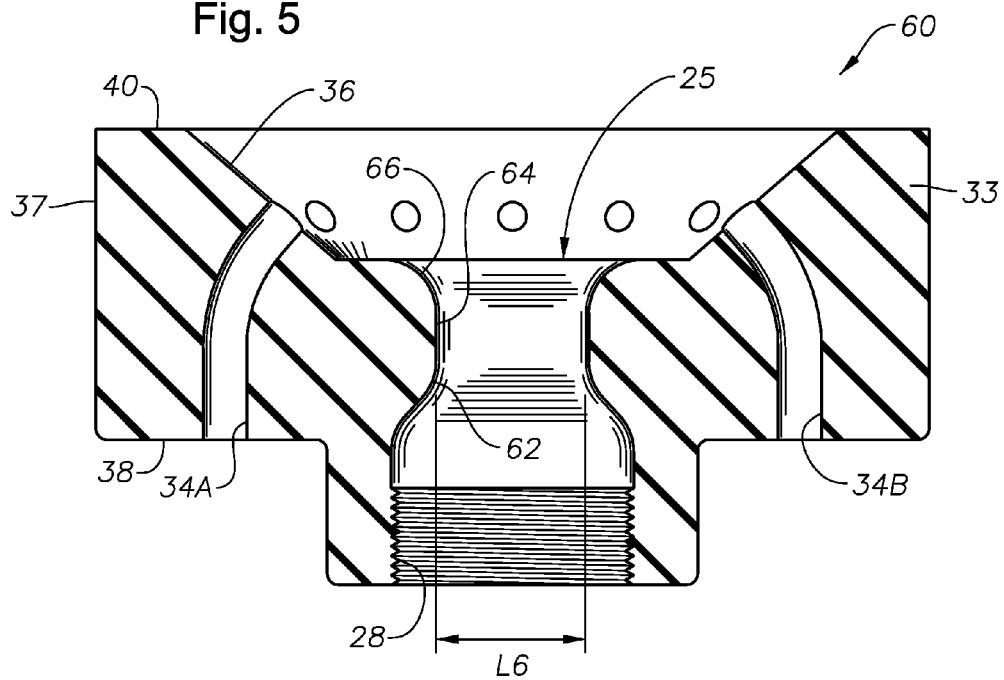

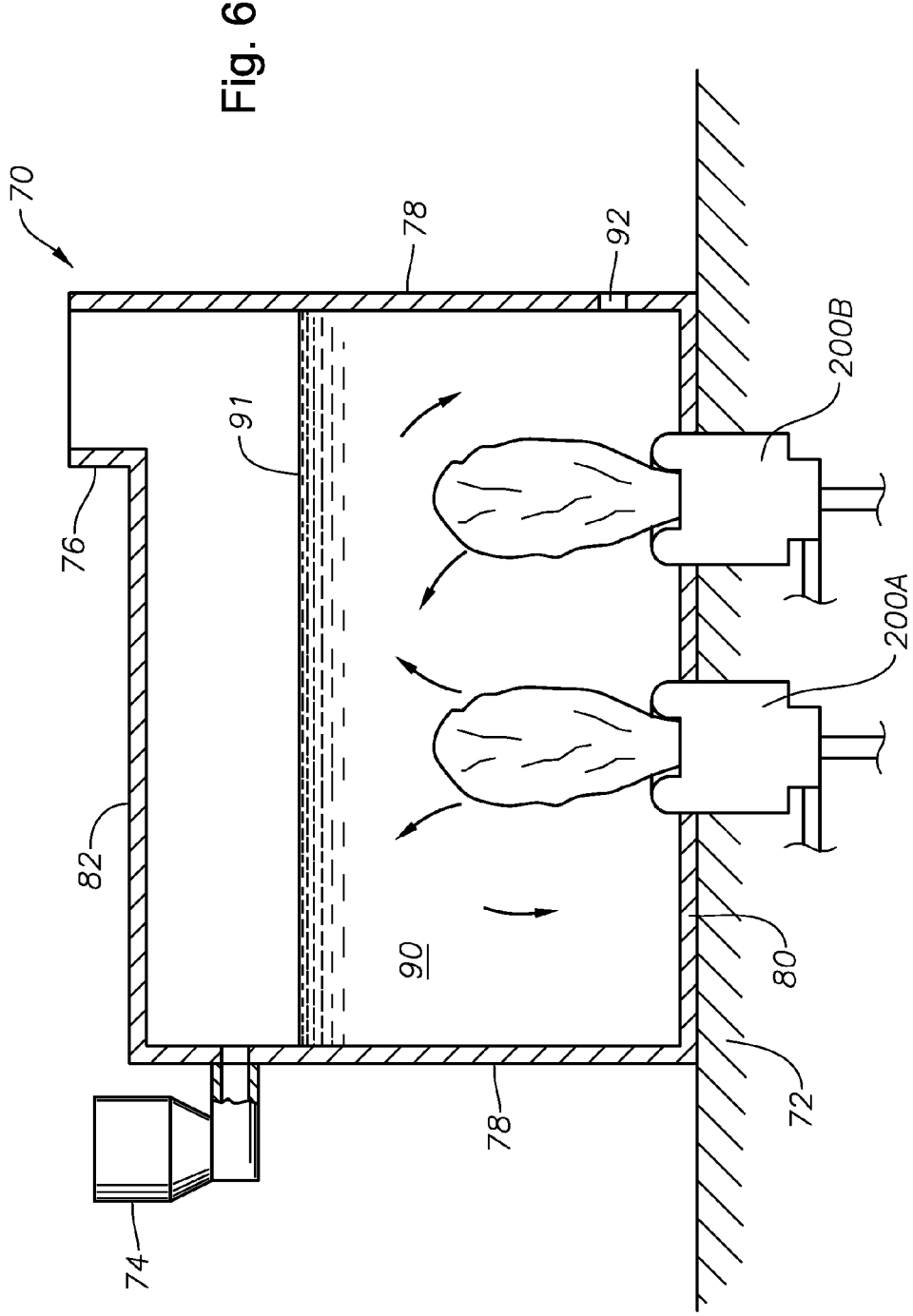

BURNER APPARATUS, SUBMERGED COMBUSTION MELTERS INCLUDING THE BURNER, AND METHODS OF USE

CROSS-REFERENCE TO RELATED APPLICATIONS

This application is a division of U.S. application Ser. No. 13/268,028, filed Oct. 7, 2011, now U.S. Pat. No. 8,875,544, issued Nov. 4, 2014, which is related to assignee's U.S. non-provisional patent application Ser. No. 12/817,754, filed Jun. 17, 2010, now U.S. Pat. No. 8,769,992, issued Jul. 8, 2014, and Ser. No. 12/888,970, filed Sep. 23, 2010, now U.S. Pat. No. 8,650,914, issued Feb. 18, 2014, both of which are incorporated herein by reference. This application is also related to assignee's application Ser. No. 13/268,065, filed Oct. 7, 2011, now U.S. Pat. No. 8,973,400, issued Mar. 10, 2015, and application Ser. No. 13/268,098, filed Oct. 7, 2011, now U.S. Pat. No. 8,707,740 issued Apr. 29, 2014.

BACKGROUND INFORMATION

Technical Field

The present disclosure relates generally to the field of combustion burners and methods of use, and more specifically to burners, submerged combustion melters, and methods of their use, particularly for melting glass forming materials.

Background Art

Oxy-fuel burners have been used for many years in the glass industry in general especially in the fiberglass, TV glass, and container glass industry segments. There are few complete oxy-fuel fired float furnaces in the operation today and they have been using retrofit oxy-fuel burners designed specifically for smaller container or fiberglass furnaces. These conversions were most likely made to meet emissions standards. Known oxy-fuel burners are predominately nozzle mix designs and avoid premixing for safety reasons due to the increased reactivity of using oxygen as the oxidant versus air. Known oxy-fuel burners for submerged combustion are fixed designs, such that once built, they are not easily modified, for example for use with varying melter feeds, fuels, and oxidants.

Therefore, it would be an advance in the submerged combustion art to develop submerged combustion burners to melt glass-forming materials, reduce energy requirements a significant amount in glass manufacturing processes, and to make their implementation attractive, particularly in situations where melter feeds, fuels, and/or oxidants are changing or expected to change.

SUMMARY

In accordance with the present disclosure, burner apparatus and processes of use are described that may allow tuning of one or more burner parameters using a burner insert. Geometric features of the insert, in some embodiments combined with geometric features of other components of the burners, may provide the ability to control the depth of fuel and oxidant interaction below the overall exit of the burner.

A first aspect of the disclosure is an apparatus, the apparatus comprising:

a first conduit comprising a first end, a second end, a longitudinal bore having a longitudinal axis, and an external surface;

a second conduit substantially concentric with the first conduit, the second conduit comprising a first end, a second end, and an internal surface;

the first and second conduits configured to form a primary annulus between the external surface of the first conduit and the internal surface of the second conduit; and an adjustable structure comprising a body having an upper surface, a lower surface, a circumferential surface abutting a portion of the internal surface of the second conduit, and a generally cylindrical central hub concentric with the longitudinal axis, the structure adjustable axially in relation to and removably attached to the first end of the first conduit via the hub, the hub defining a central passage having an exit at the upper surface, the body comprising one or more non-central through passages extending from the lower to the upper surface, the non-central passages configured such that flow of a first fluid through the non-central passages causes the first fluid to intersect a flow of a second fluid in a mixing region above the upper surface of the body.

A second aspect of the disclosure is an adjustable burner apparatus, comprising:

a first conduit comprising a first end, a second end, a longitudinal bore having a longitudinal axis, and an external surface, the first end comprising threads on the external surface, a second conduit substantially concentric with the first conduit, the second conduit comprising a first end, a second end, and an internal surface, the first and second conduits configured to form a primary annulus between the external surface of the first conduit and the internal surface of the second conduit;

a body having an upper surface, a lower surface, a circumferential surface abutting a portion of the internal surface of the second conduit, and a generally cylindrical central hub concentric with the longitudinal axis, the structure adjustable axially in relation to and threadedly attached to the threads of first end of the first conduit via the hub, the hub defining a central passage having an exit at the upper surface, the body comprising one or more non-central through passages extending from the lower to the upper surface, the non-central passages configured such that flow of a first fluid through the non-central passages causes the first fluid to intersect a flow of a second fluid in a mixing region above the upper surface of the body;

a third substantially concentric conduit comprising a first end, a second end, and an internal surface, the internal surface of the third conduit forming, with an exterior surface of the second conduit, a secondary annulus external to the primary annulus;

the first end of the third conduit extending beyond the first end of the second conduit, the first end of the second conduit extending beyond the first end of the first conduit, and the secondary annulus is capped by an end cap connecting the first end of the second conduit and the first end of the third conduit; and the second end of the second conduit sealed around the first conduit, and the second end of the third conduit sealed around the second conduit, forming a cavity for fluid to circulate.

A third aspect of the disclosure are methods, comprising:

a) flowing an oxidant into an annulus between inner and outer conduits of a concentric conduit burner;

b) flowing a fuel to the inner conduit of the concentric burner;

c) flowing the oxidant through a plurality of non-central passages in an adjustable, removable structure, and the fuel through a central passage in the adjustable removable structure, the structure comprising a body having an upper surface, a lower surface, a circumferential surface abutting a portion of an internal surface of the second conduit, and a generally cylindrical central hub concentric with a longitudinal axis of the inner conduit, the structure adjustable axially in relation to and removably attached to a first end of the first conduit via the hub, the hub defining the central passage having an exit at the upper surface, the body comprising the plurality of non-central through passages extending from the lower to the upper surface, the non-central passages configured such that flow of oxidant through the non-central passages causes the oxidant to intersect flow of the fuel in a mixing region above the upper surface of the body.

A fourth aspect of this disclosure are methods of producing molten glass comprising:

a) flowing an oxidant into an annulus between inner and outer conduits of a concentric conduit burner;

b) flowing a fuel to the inner conduit of the concentric burner;

c) flowing the oxidant through a plurality of non-central oxidant passages in an adjustable, removable structure, and the fuel through a central fuel passage in the adjustable removable structure, the structure comprising a body having an upper surface, a lower surface, a circumferential surface abutting a portion of an internal surface of the second conduit, and a generally cylindrical central hub concentric with a longitudinal axis of the inner conduit, the structure adjustable axially in relation to and removably attached to a first end of the first conduit via the hub, the hub defining the central passage having an exit at the upper surface, the body comprising the plurality of non-central through passages extending from the lower to the upper surface, the non-central passages configured such that flow of oxidant through the non-central passages causes the oxidant to intersect flow of the fuel in a mixing region above the upper surface of the body;

d) combusting at least some of the fuel in the mixing region to form a flame and combustion products, the mixing region defined by the upper surface of the body and a burner extension, wherein the exits of the non-central oxidant passages and the exit of the central fuel passage are recessed from an exit of the burner extension; and e) directing the flame and combustion products into partially molten glass forming materials above the mixing region.

Certain methods within the disclosure include methods wherein the oxidant may be an oxygen stream comprising at least 90 mole percent oxygen, and the fuel may be a gaseous fuel, the gaseous fuel selected from the group consisting of methane, natural gas, liquefied natural gas, propane, carbon monoxide, hydrogen, steam-reformed natural gas, atomized oil or mixtures thereof.

Apparatus and methods of the disclosure will become more apparent upon review of the brief description of the drawings, the detailed description of the disclosure, and the claims that follow.

BRIEF DESCRIPTION OF THE DRAWINGS

The manner in which the objectives of the disclosure and other desirable characteristics can be obtained is explained in the following description and attached drawings in which:

FIGS. 4 and 5 are cross-sectional views of two other embodiments of adjustable, removable burner components of the present disclosure;

FIG. 6 is a side-elevation view, partially in cross-section of a submerged combustion melter in accordance with the present disclosure, including two burners of the disclosure.

Figure 1:
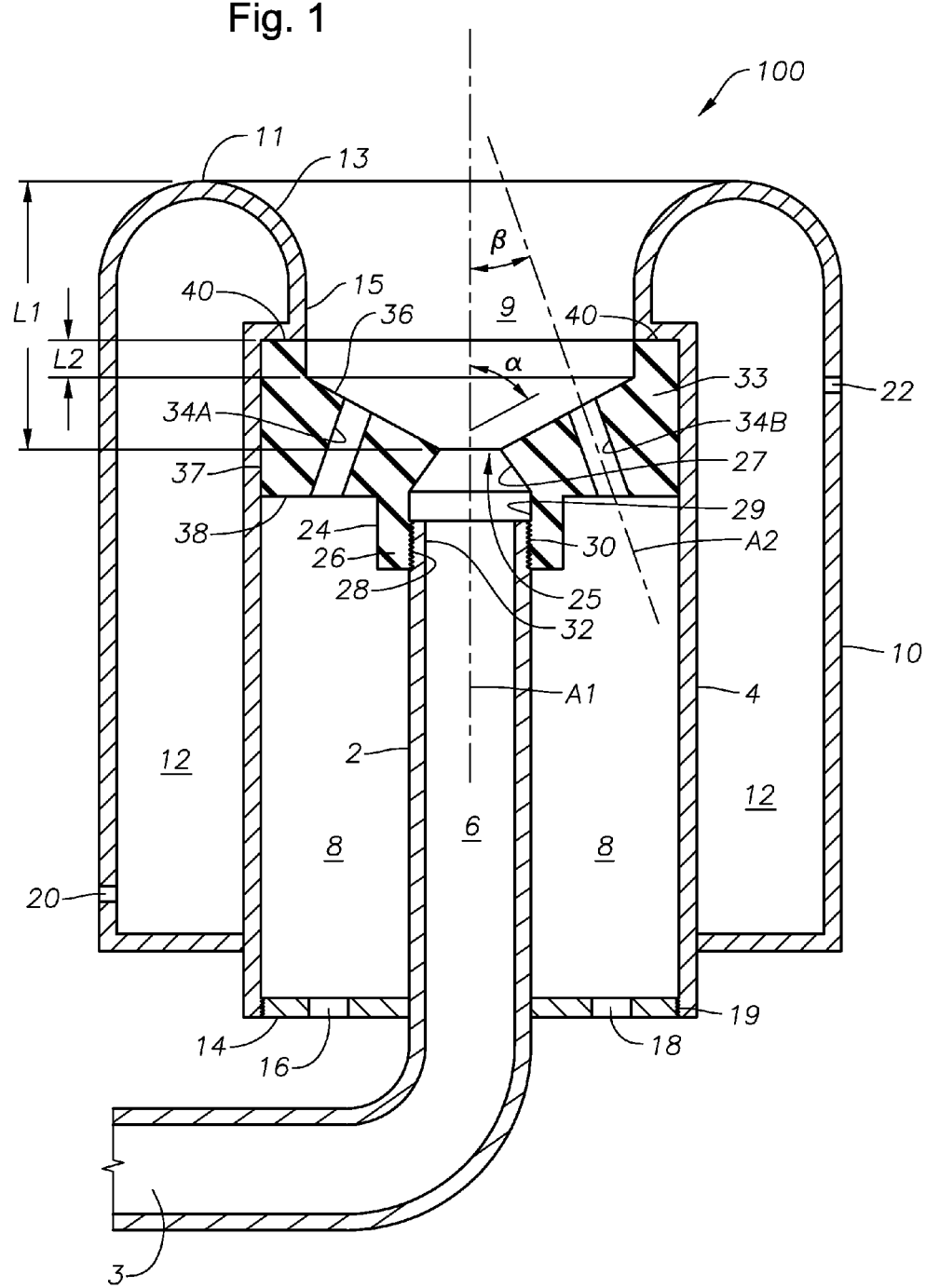
FIGS. 1 and 2 are cross-sectional views of two burner apparatus within the present disclosure.

It is to be noted, however, that the appended drawings are not to scale and illustrate only typical embodiments of this disclosure, and are therefore not to be considered limiting of its scope, for the disclosure may admit to other equally effective embodiments.

DETAILED DESCRIPTION

In the following description, numerous details are set forth to provide an understanding of the disclosed apparatus and methods. However, it will be understood by those skilled in the art that the apparatus and methods covered by the claims may be practiced without these details and that numerous variations or modifications from the specifically described embodiments may be possible and are deemed within the claims. All U.S. published patent applications and U.S. Patents referenced herein are hereby explicitly incorporated herein by reference. In the event definitions of terms in the referenced patents and applications conflict with how those terms are defined in the present application, the definitions for those terms that are provided in the present application shall be deemed controlling.

The term "fuel", according to this disclosure, means a combustible composition comprising a major portion of, for example, methane, natural gas, liquefied natural gas, propane, atomized oil or the like (either in gaseous or liquid form). Fuels useful in the disclosure may comprise minor amounts of non-fuels therein, including oxidants, for purposes such as premixing the fuel with the oxidant, or atomizing liquid fuels. As used herein the term "fuel" includes gaseous fuels, liquid fuels, flowable solids, such as powdered carbon or particulate material, waste materials, slurries, and mixtures or other combinations thereof. When the fuel comprises gaseous fuel, the gaseous fuel may be selected from the group consisting of methane, natural gas, liquefied natural gas, propane, carbon monoxide, hydrogen, steam-reformed natural gas, atomized oil or mixtures thereof.

"Oxidant" means air, or compositions comprising the same molar concentration of oxygen as air, while the term "oxygen" means a gas with an oxygen molar concentration of at least 50%. Such oxidants include oxygen-enriched air containing at least 50% vol., oxygen such as "industrially" pure oxygen (99.5%) produced by a cryogenic air separation plant or non-pure oxygen produced by an adsorption process or membrane permeation process (about 90% vol. oxygen or more).

Conduits and adjustable, changeable, removable bodies used in burners of the present disclosure may be comprised of metal, ceramic, ceramic-lined metal, or combination thereof. Suitable metals include stainless steels, for example, but not limited to, 306 and 316 steel, as well as titanium alloys, aluminum alloys, and the like.

The term "coolant" may include any heat transfer fluid and may be any gaseous, liquid, or some combination of gaseous and liquid composition that functions or is capable of being modified to function as a heat transfer fluid. Gaseous heat transfer fluids may be selected from air, including ambient air and treated air (for example, air treated to remove moisture), inorganic gases, such as nitrogen, argon, and helium, organic gases such as fluoro-, chloro- and chlorofluorocarbons, including perfluorinated versions, such as tetrafluoromethane, and hexafluoroethane, and tetrafluoroethylene, and the like, and mixtures of inert gases with small portions of non-inert gases, such as hydrogen. Heat transfer liquids may be selected from liquids that may be organic, inorganic, or some combination thereof, for example, salt solutions, glycol solutions, oils and the like. Other possible heat transfer fluids include steam (if cooler than the expected glass melt temperature), carbon dioxide, or mixtures thereof with nitrogen. Heat transfer fluids may be compositions comprising both gas and liquid phases, such as the higher chlorofluorocarbons.

In all embodiments of the disclosure the sources of oxidant and fuel may be one or more conduits, pipelines, storage facility, cylinders, or, in embodiments where the oxidant is air, ambient air. Oxygen-enriched oxidants may be supplied from a pipeline, cylinder, storage facility, cryogenic air separation unit, membrane permeation separator, or adsorption unit such as a vacuum swing adsorption unit. Certain burner and melter embodiments may comprise a source of oxidant fluidly connected to the second conduit for routing the oxidant to the primary annulus, wherein the oxidant is selected from the group consisting of air and oxygen-enriched air, and a source of fuel fluidly connected to the second end of the first conduit for routing the fuel to the longitudinal bore of the first conduit.

Certain apparatus may include a third substantially concentric conduit comprising a first end, a second end, and an internal surface, the internal surface of the third conduit forming, with an exterior surface of the second conduit, a secondary annulus external to the primary annulus. The first end of the conduit may extend beyond the first end of the second conduit, the first end of the second conduit may extend beyond the first end of the first conduit, and the secondary annulus may be capped by an end cap connecting the first end of the second conduit and the first end of the third conduit.

Certain apparatus and method embodiments of the disclosure may be controlled by one or more controllers. For example, burner flame temperature may be controlled by monitoring one or more parameters selected from velocity of the fuel, velocity of the primary oxidant, mass flow rate of the fuel, mass flow rate of the primary oxidant, energy content of the fuel, temperature of the fuel as it enters the burner, temperature of the primary oxidant as it enters the burner, temperature of the effluent, pressure of the primary oxidant entering the burner, humidity of the oxidant, burner geometry, combustion ratio, and combinations thereof. Exemplary apparatus and methods of the disclosure may comprise a combustion controller which receives one or more input parameters selected from velocity of the fuel, velocity of the primary oxidant, mass flow rate of the fuel, mass flow rate of the primary oxidant, energy content of the fuel, temperature of the fuel as it enters the burner, temperature of the primary oxidant as it enters the burner, pressure of the oxidant entering the burner, humidity of the oxidant, burner geometry, oxidation ratio, temperature of the effluent and combinations thereof, and may employ a control algorithm to control combustion temperature based on one or more of these input parameters.

Figure 2:
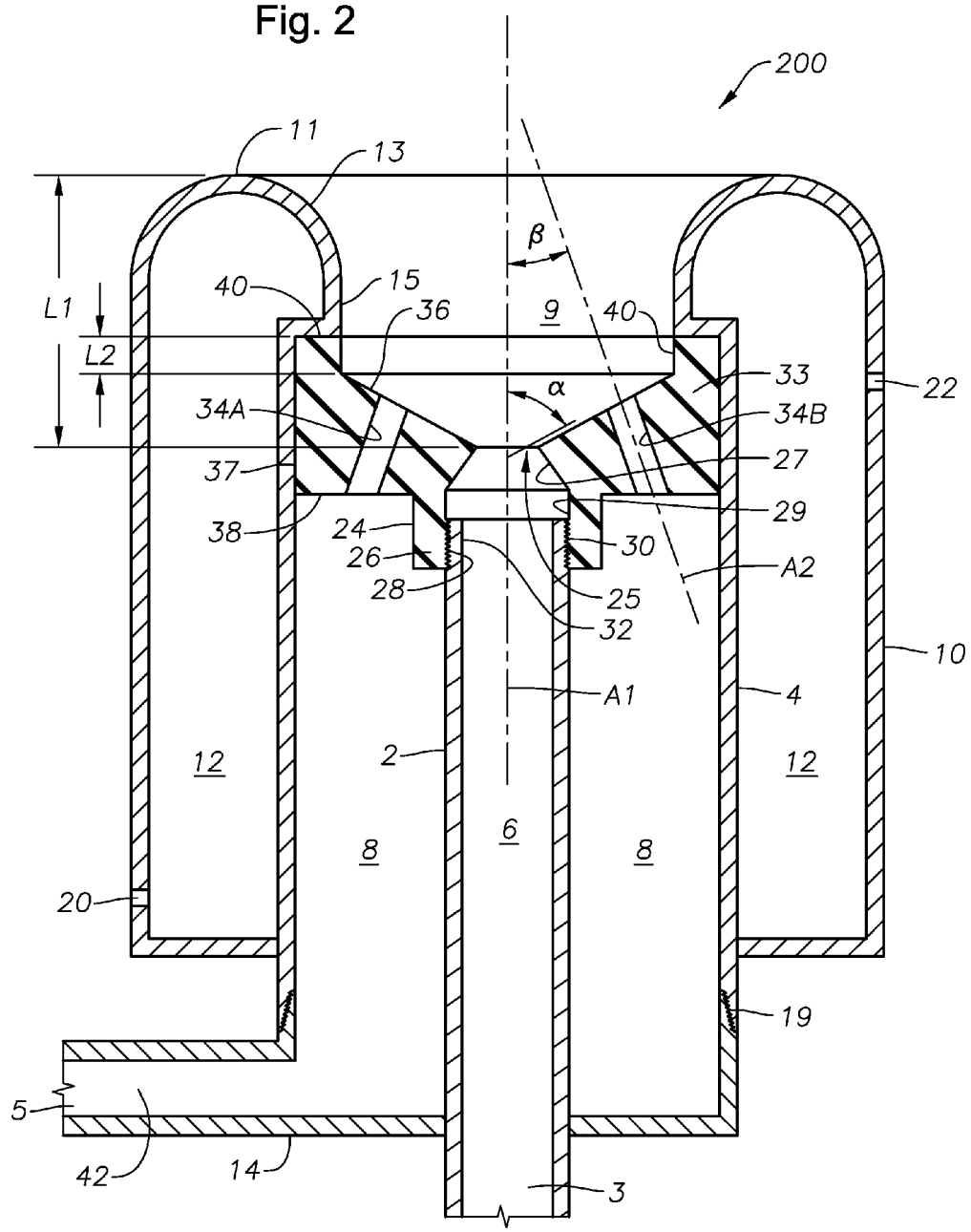

Referring now to the figures, FIGS. 1 and 2 are cross-sectional views of two burner apparatus embodiments 100 and 200 within the present disclosure, which are similar except that embodiment 100 is configured to employ air as oxidant, and embodiment 200 is configured to employ an oxygen-enriched oxidant. Embodiments 100 and 200 include an inner or first conduit 2 having an inlet 3, and an outer or second conduit 4 having an inlet 5. Inner conduit 2 defines a longitudinal bore 6 having a longitudinal axis A1, and inner conduit 2 and outer conduit 4 define a primary annulus 8 between them. A third conduit 10 forms an outer body of burners 100 and 200, with a cavity or secondary annulus 12 formed between third conduit 12 and second conduit 4. An end cap 13 defines an upper tip 11 of burner 100 and burner 200, which may be generally doughnut-shaped, or other shape. End cap 13 may be integral with outer conduit 10 as illustrated, or may be a separate component attached to outer conduit 10 and inner conduit 4 via threads, screws, rivets, and the like. A lower plate 14 is included in both embodiments 100 and 200, with slight structural differences, and may include threads 19 or other removable fastener to secure plate 14 and inner conduit 2 into burners 100 and 200. Inlets 16, 18 are provided in embodiment 100 for aspirating air into burner 100, as well as coolant fluid inlet 20 and outlet 22 in outer conduit 10. Embodiments employing more than one coolant inlet and more than one coolant outlet are considered within the disclosure, but may not be necessary in all circumstances. Embodiment 200 includes a plenum 42 for delivering a fluid into primary annulus 8, although plenum 42 may not be necessary in all embodiments. For example, where oxygen is used as an oxidant, the present disclosure contemplates embodiments where two or more oxygen supply conduits feed primary annulus 8.

Another component of burner embodiments of the present disclosure is an adjustable, changeable and removable structure or insert, designated 24 in FIGS. 1-3. Body 24 is adjustable in the sense that threads 28 or other connectors to inner conduit 2 allow variation of the axial position of insert 24. Furthermore, physical parameters of insert 24 may be changed, as discussed herein. Finally, the entire insert may be removed and replaced with another insert of same or different dimensions if desired.

Insert 24 includes a body 33 having a central hub 26 that is, in certain embodiments, parallel to longitudinal axis A1, but not necessarily so, hub 26 including a central passage having an exit 25 that is, in certain embodiments, perpendicular to longitudinal axis A1, but not necessarily so. Body 33 includes an upper surface 36 and a lower surface 38, and one or more non-central passages 34. In FIGS. 1-3, two of the non-central passages 34A and 34B are visible. Upper surface 36 helps define, along with end cap 13, a mixing region 9 where fluids emanating from central exit 25, which may be a fuel stream, and non-central passages 34, which may be oxidant streams, at least partially mix. The streams may be switch in certain embodiments (in other words, fuel may traverse one or more non-central passages 34 while oxidant emanates from central exit 25). In embodiments where the oxidant flows through the central passage, the flame shape may be broader and the velocity of the combustion products lower in the vertical direction to enable more combustion and energy release lower in the molten glass pool to enhance efficiency. Body 24 further includes a circumferential surface 37 that is adjacent a portion of the inner surface of second conduit 4, near the upper end of second conduit 4.

Figure 3A:
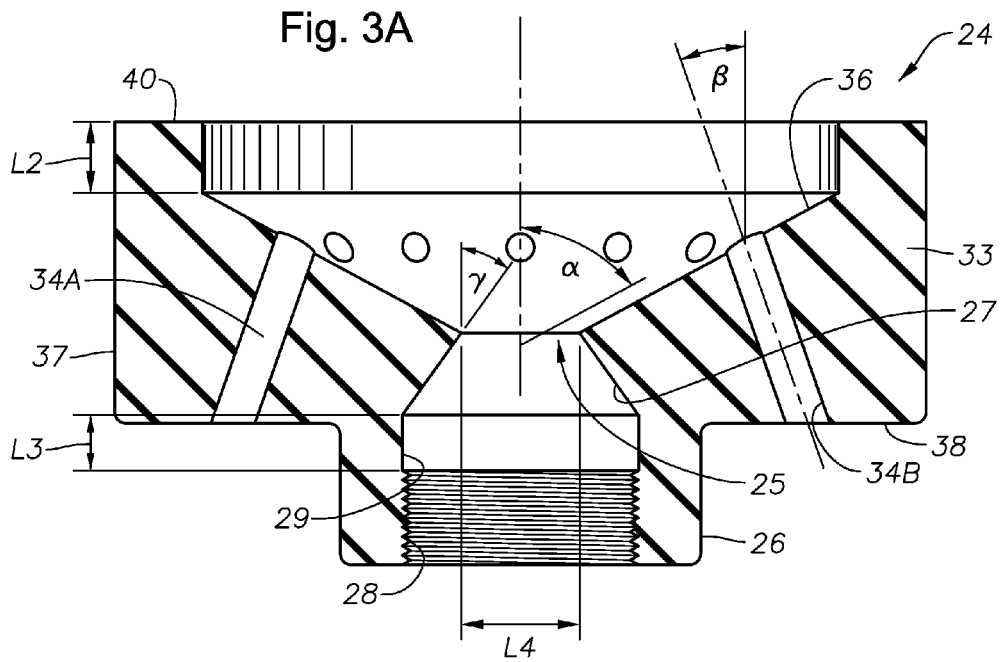
FIG. 3A is a cross-sectional view of one embodiment of an adjustable, removable component of the burners of FIGS. 1 and 2 taken along the line A-A of FIG. 3B, which is a plan view of the same component.

As illustrated in embodiments 100 and 200 of FIGS. 1 and 2, body 24 of embodiments 100 and 200 may include a circumferential lip 40 that abuts against an overhang portion 15 of end cap 13. End cap 13 has a length or height L1, and lip 40 has a length L2 from overhang portion 15 to upper surface 36 of body 24, where L2 may range from about 025 inch to about 2 inches. Circumferential lip extension 40 extends away from upper surface 36 of body 24 and generally parallel to longitudinal axis L1. End cap 13 may extend above exit 25 of the substantially central passage of hub 26 a distance L1, which may range from about 0.5 inch to about 6 inches. Vertical connector section 29 may have a length L3 ranging from about 0.25 inch to about 1 inch. As illustrated in FIG. 3A, exit 25 of the substantially central passage has a diameter L4. L4 may range from about 0.25 inch to about 3.0 inches. Lengths L1, L2, L3, and L4 are parameters that may be changeable and/or adjustable (as those terms are defined herein) in certain embodiments to achieve desired results, for example flame length, and may be interdependent. For example, length L1 may be adjustable and changeable, while lengths L2, L3, and L4 are only changeable from burner to burner.

Hub 26 includes, in embodiments 100 and 200, an angled or tapered section 27 connecting exit 25 and a vertical connector section 29 that connects angled section 27 with a threaded section 28. Threads on threaded section 28 mate with corresponding threads 30 on an upper end 32 of inner conduit 2. This threaded connection allows removal of insert 24 and/or adjustment of burner parameters, as discussed further herein.

FIGS. 1-3 illustrate three angles α, β, and γ, one or more of which may be changeable features in burners of the present disclosure. As used herein the word "changeable", when referring to a burner feature, means that that feature may be physically different from burner to burner by machining or molding, for example, while the term "adjustable" means that a feature of a burner may actually be varied without making physical modifications to the burner. Angle α is an angle that upper surface 36 of body 33 makes with longitudinal axis L1, and may range from about 45 to about 90 degrees. As illustrated in embodiments 100 and 200 of FIGS. 1 and 2, in certain embodiments the non-central passages are generally linear and angled at an angle β measured from the longitudinal axis, the β angle ranging from about 10 degrees to about 45 degrees. As illustrated in embodiments 100 and 200 of FIGS. 1 and 2, the substantially central passage may comprise an angled section 27 and a vertical connector section 29 connecting angled section 27 with threaded section 28 of hub 26. Angled section 27 may form an angle γ to longitudinal axis L1 ranging from about 10 degrees to about 45 degrees.

Figure 3B:
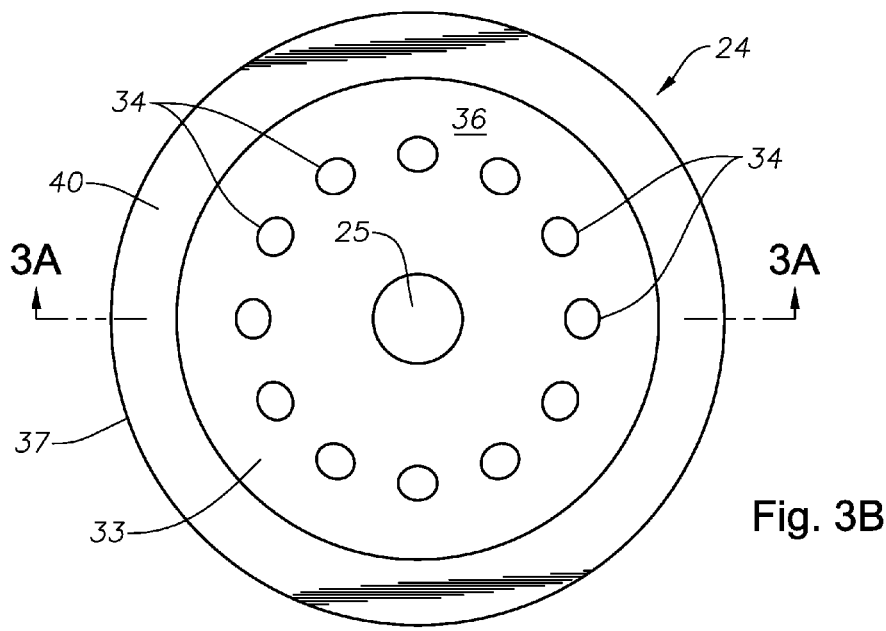

FIG. 3A is a cross-sectional view of embodiment 24 of an adjustable, removable component of the burners of FIGS. 1 and 2 taken along the line A-A of FIG. 3B, which is a plan view of the same embodiment.

FIGS. 4 and 5 are cross-sectional views of two other embodiments of adjustable, removable burner components of the present disclosure. As illustrated schematically in embodiment 50 of FIG. 4, the non-central passages may comprise a vertical section 44A, 44B, and an angled section 46A, 46B. Vertical section 44A, 44B begins at lower surface 38 of body 24 and intersects angled section 46A, 46B, respectively, in body 24 at position 47A, 47B, which may vary from burner to burner in accordance with the present disclosure. Angled section 46A, 46B ends at upper surface 36 of body 24. Another optional feature of burners of the present disclosure is a vertical extension 31 connecting angled section 27 with exit 25. The length of vertical section 31, designated L5, may be another feature of burners of the present disclosure that may be changed to affect burner operation. L5 may range from 0 to about 3 inches, or from about 0.25 to about 2 inches.

In embodiment 60 illustrated schematically in cross-section in FIG. 5, the non-central passages may be smoothly curved passages 34A, 34B. In embodiment 60 the substantially central passage comprises a venturi nozzle 62 comprising a converging section 64 and a diverging section 66, where diverging section 66 is positioned downstream of converging section 64 and fluidly connects converging section 64 with nozzle exit 25. Converging section 64 defines a throat having a diameter L6, another feature that may be changed in burners of the present disclosure. L6 may range from about 0.25 inch to about 2 inches, or form 0.25 inch to about 1 inch.

FIG. 6 is a side-elevation view, partially in cross-section, of a submerged combustion melter embodiment 70 in accordance with the present disclosure, positioned on a plant floor or other surface 72, including two burners 200A and 200B of the disclosure. More than or less than two burners of the present disclosure may be used, as well as burners of other designs, as long as one burner of the present disclosure is present. Melter 70 includes sidewalls 78, a floor 80, a roof 82, an exhaust chute 76, and a glass melt exit 92. A glass-forming material feed bin 74 may be attached to melter sidewall 78. One or more burners 200 may be in one or more sidewalls 78, as long as the flame and/or products of combustion emanate below surface 91 of melt 90. Burners 200 may be positioned in sidewalls 78 or floor 80 of a submerged combustion melter apparatus such that the longitudinal axis A1 (FIGS. 1-3) makes an angle to the side panel 78 or floor 80 of the melter ranging from about 30 to about 90 degrees. Sidewalls 78, floor 80, and roof 82 are typically composed of ceramic or other refractory material. Other melter designs, having other feed arrangements, burner arrangements, and wall designs, such as disclosed in assignee's co-pending application Ser. No. 12/817,754, filed Jun. 17, 2010 now U.S. Pat. No. 8,769,992, issued Jul. 8, 2014; Ser. No. 12/888,970 filed Sep. 23, 2010 now U.S. Pat. No. 8,650,914, issued Feb. 18, 2014; Ser. No. 13/267,990, filed Oct. 7, 2011, now U.S. Pat. No. 8,997,525, issued Apr. 7, 2015; Ser. No. 13/268,065, filed Oct. 7, 2011 now U.S. Pat. No. 8,973,400, issued Mar. 10, 2015; Ser. No. 13/268,098, filed Oct. 7, 2011 now U.S. Pat. No. 8,707,740, issued Apr. 29, 2014; Ser. No. 13/268,130, filed Oct. 7, 2011, now U.S. Pat. No. 9,021,838, issued May 5, 2015, and U.S. Pat. No. 7,273,583, are considered within the present disclosure if using one or more burners of the present disclosure.

Figure 7:
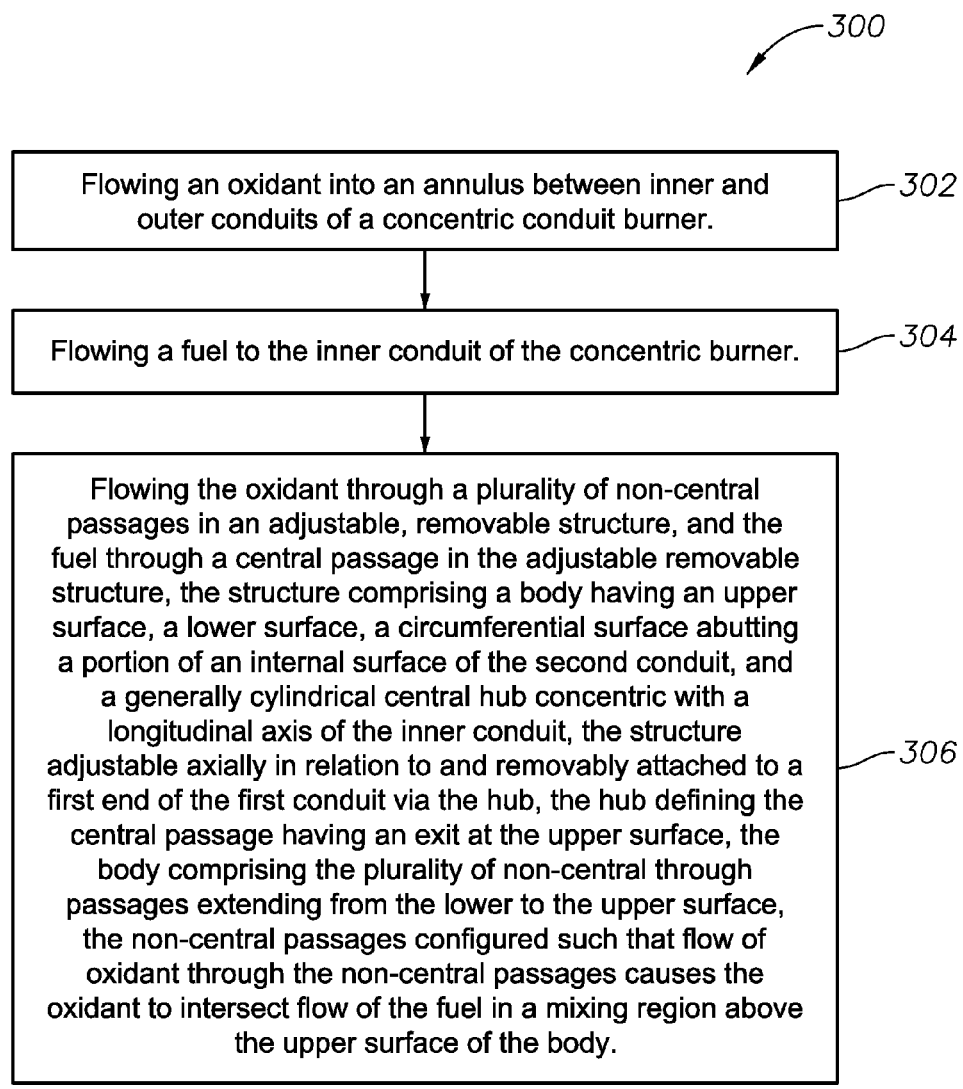
FIGS. 7 and 8 are logic diagrams of two methods in accordance with the present disclosure.
Figure 8:
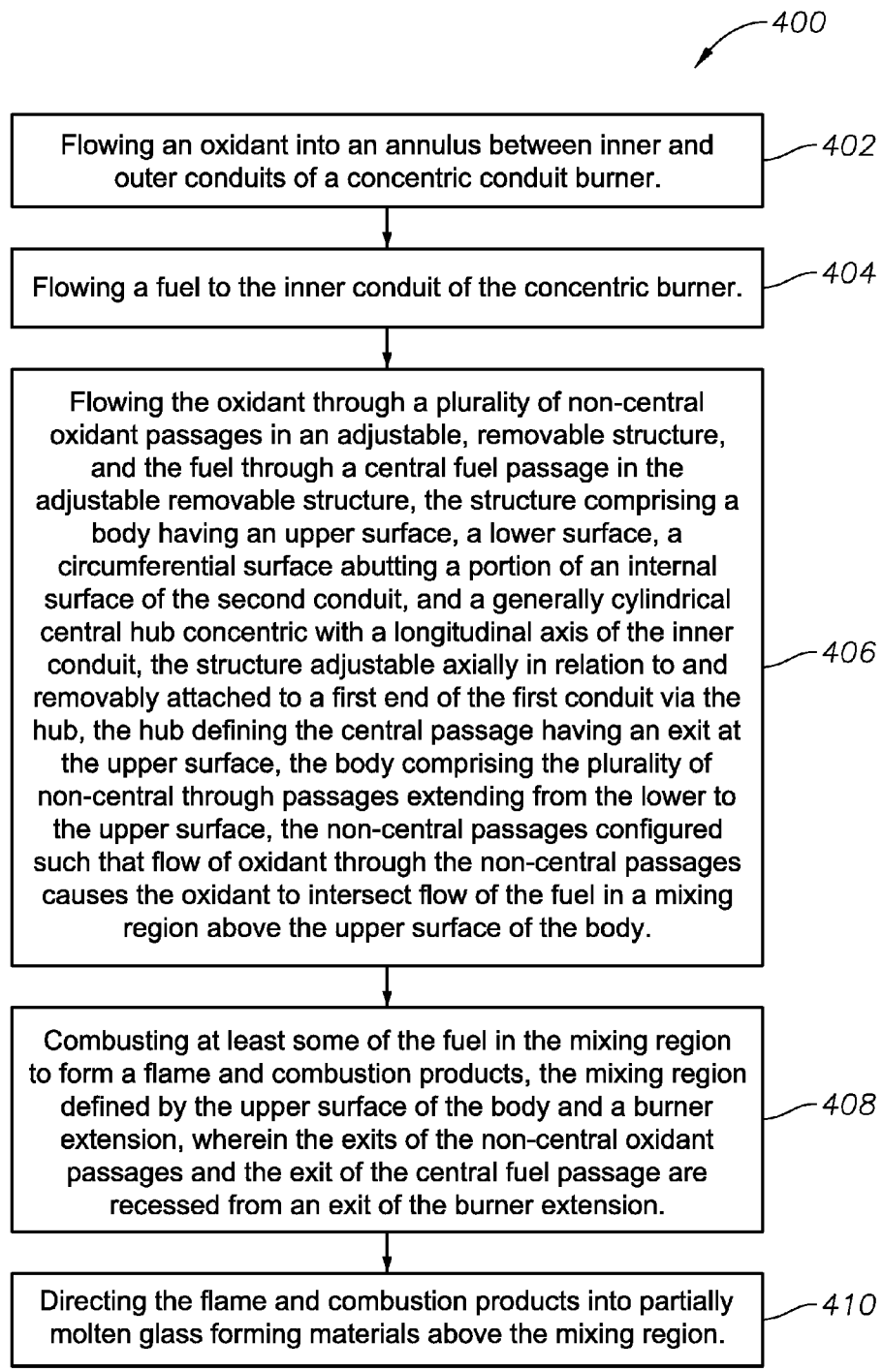

FIGS. 7 and 8 are logic diagrams of two method embodiments in accordance with the present disclosure. The method of embodiment 300 of FIG. 7 comprises flowing an oxidant into an annulus between inner and outer conduits of a concentric conduit burner, box 102, and flowing a fuel to the inner conduit of the concentric burner, box 104. Method embodiment 300 further comprises flowing the oxidant through a plurality of non-central passages in an adjustable, removable structure, and the fuel through a central passage in the adjustable removable structure, box 106. The structure comprises a body having an upper surface, a lower surface, a circumferential surface abutting a portion of an internal surface of the second conduit, and a generally cylindrical central hub concentric with a longitudinal axis of the inner conduit, the structure adjustable axially in relation to and removably attached to a first end of the first conduit via the hub, the hub defining the central passage having an exit at the upper surface, the body comprising the plurality of non-central through passages extending from the lower to the upper surface, the non-central passages configured such that flow of oxidant through the non-central passages causes the oxidant to intersect flow of the fuel in a mixing region above the upper surface of the body.

Another method of this disclosure is presented in the logic diagram of FIG. 7 as embodiment 400. Embodiment 400 is a method of producing molten glass, and comprises the steps of flowing an oxidant into an annulus between inner and outer conduits of a concentric conduit burner, box 402, and flowing a fuel to the inner conduit of the concentric burner, box 404. Method embodiment 400 then comprises flowing the oxidant through a plurality of non-central oxidant passages in an adjustable, removable structure, and the fuel through a central fuel passage in the adjustable removable structure, box 406. The structure comprises a body having an upper surface, a lower surface, a circumferential surface abutting a portion of an internal surface of the second conduit, and a generally cylindrical central hub concentric with a longitudinal axis of the inner conduit, the structure adjustable axially in relation to and removably attached to a first end of the first conduit via the hub, the hub defining the central passage having an exit at the upper surface, the body comprising the plurality of non-central through passages extending from the lower to the upper surface, the non-central passages configured such that flow of oxidant through the non-central passages causes the oxidant to intersect flow of the fuel in a mixing region above the upper surface of the body. Method embodiment 400 then comprises combusting at least some of the fuel in the mixing region, box 408, to form a flame and combustion products, the mixing region defined by the upper surface of the body and a burner extension, wherein the exits of the non-central oxidant passages and the exit of the central fuel passage are recessed from an exit of the burner extension. The burner directs the flame and combustion products into partially molten glass forming materials above the mixing region, box 410.

In operation of burners of the disclosure, in exemplary embodiments oxidant may be fed to the primary annulus, and a fuel to the longitudinal bore of the first conduit. In inorganic glass-forming material is charged to the melter. The mass flow rate of the inorganic material, for example glass, is a function of the composition of the feed material, desired composition, viscosity, and temperature of the molten glass, the flame temperature of the burner(s), the burner geometry, for example burner exit, nozzle exit, and non-central passages sizes, the pressure in the mixing region of the burner, and other parameters. The process operating conditions are generally not independent values but have some degree of interaction. Oxygen-enhanced oxidant/fuel melting is markedly different than the traditional air-fuel melting processes. The general principle is to operate combustion in the mixing region of the burner in a manner that replaces some of the air with a separate source of oxygen. The overall combustion ratio may not change. The process of combining fuel and oxygen-enriched oxidant will, in most embodiments, primarily occur in the mixing region, after the gases have passed over a flame arrestor safety device. Varying the oxygen content of the oxidant can control the flame temperature of the combustion gases.

The length of non-central passages 34 and central passage through hub 26 may vary widely, but generally may range from about 0.25 inch to about 10 inches, or from about 0.5 inch to about 3 inches, while the diameter of the non-central passages 34 may range from about 1/32 inch up to 1 inch, or from about 0.25 inch up to about 0.5 inch, depending on the number and location of non-central passages 34. The greater the number of non-central passages 34, generally the smaller their diameter, although this may not be so in every embodiment. Also, the greater the diameter of the central passage through hub 26, generally the larger the diameter, or greater number, or both of non-central passages 34. If oxidant flows through non-central passages 34, the ratio of number of non-central oxidant passages 34 to central fuel passage through hub 26 may range from about 2 to 1 to about 30 to 1, or from about 4 to 1 to about 10 to 1. The non-central passages 34 may all be circular in cross-section and have the same diameter; in other embodiments they may not. Apparatus within this disclosure include those wherein the non-central conduits 34 may all be equal in length, although the disclosure is not so limited. The diameters of the central and non-central passages may adjusted in accordance with a number of factors such as glass depth, system pressure drops, and burner outputs.

In general, the inner conduit 2 may have an inner diameter (ID) ranging from about 1 inch up to about 5 inches (2.5 cm to 13 cm), or from about 2 inches up to about 4 inches (5 cm to 10 cm).

The total quantities of fuel and oxidant used by burners of the present disclosure may be such that the flow of oxygen may range from about 0.9 to about 1.2 of the theoretical stoichiometric flow of oxygen necessary to obtain the complete combustion of the fuel flow. Another expression of this statement is that the combustion ratio may range from about 0.9 to about 1.2.

The velocity of the fuel in the various burner embodiments of the present disclosure depends on the burner geometry used, but generally is at least about 15 meters/second (m/s). The upper limit of fuel velocity depends primarily on the desired penetration of flame and/or combustion products into the glass melt and the geometry of the burner; if the fuel velocity is too low, the flame temperature may be too low, providing inadequate temperature in the melter, which is not desired, and if the fuel flow is too high, flame and/or combustion products might impinge on a melter wall or roof, or cause carryover of melt into the exhaust, or be wasted, which is also not desired. Similarly, oxidant velocity should be monitored so that flame and/or combustion products do not impinge on a melter wall or roof, or cause carryover of melt into the exhaust, or be wasted. Oxidant velocities depend on fuel flow rate and fuel velocity, but in general should not exceed about 200 ft/sec at 400 scfh flow rate. The pressure in mixing region 9 of burners in accordance with the present disclosure should not exceed about 10 psig.

Additionally, certain burner embodiments of this disclosure may also be provided with stabilization of the flame with an auxiliary injection of fuel and/or oxidant gases. For example, a portion of the oxidant may be premixed with fuel as a primary oxidant, usually air, in conduit 2, in addition to a secondary oxidant injection in primary annulus 8.

Apparatus and methods of the present disclosure are intended to be used, for example, to replace combustion burners in already existing melters, and/or to be used as the main source of energy in new submerged combustion melters.

Conduits and adjustable, changeable, removable bodies used in burners of the present disclosure may be comprised of metal, ceramic, ceramic-lined metal, or combination thereof. Suitable metals include stainless steels, for example, but not limited to, 306, 316, as well as titanium alloys, aluminum alloys, and the like. High-strength materials like C-110 and C-125 metallurgies that are NACE qualified may be employed. (As used herein, "NACE" refers to the corrosion prevention organization formerly known as the National Association of Corrosion Engineers, now operating under the name NACE International, Houston, Tex.) Use of high strength steel and other high strength materials may significantly reduce the wall thickness required, reducing weight of the burners. Threaded connections may eliminate the need for $3^{rd}$ party forgings and expensive welding processes—considerably improving system delivery time and overall cost. It will be understood, however, that the use of $3^{rd}$ party forgings and welding is not ruled out for burners described herein, and may actually be preferable in certain situations. The skilled artisan, having knowledge of the particular application, pressures, temperatures, and available materials, will be able design the most cost effective, safe, and operable burners for each particular application without undue experimentation.

If ceramic materials are used, suitable materials may include fused zirconia ($ZrO_2$), fused cast AZS (alumina-zirconia-silica), rebonded AZS, or fused cast alumina ($Al_2O_3$). The choice of a particular material is dictated among other parameters by the chemistry, pressure, and temperature of fuel and oxidant used and type of glass melt to be produced.

A combustion process control scheme may be employed. A master controller may be employed, but the disclosure is not so limited, as any combination of controllers could be used. The controller may be selected from PI controllers, PID controllers (including any known or reasonably foreseeable variations of these), and may compute a residual equal to a difference between a measured value and a set point to produce an output to one or more control elements. The controller may compute the residual continuously or non-continuously. Other possible implementations of the disclosure are those wherein the controller comprises more specialized control strategies, such as strategies selected from feed forward, cascade control, internal feedback loops, model predictive control, neural networks, and Kalman filtering techniques. Sensors may be provided for the following parameters, which are merely exemplary examples: $V_{fuel}$, velocity of fuel entering burner; $V_{PO}$, velocity of primary oxidant entering burner; $V_{SO}$, velocity of secondary oxidant entering burner; $M_{fuel}$, mass flow rate of fuel entering burner; $M_{PO}$, mass flow rate of primary oxidant entering burner; $T_{fuel}$, temperature of fuel entering burner; $T_{PO}$, temperature of primary oxidant entering burner; $P_{PO}$, pressure of primary oxidant entering burner; $H_{PO}$, humidity of primary oxidant. Outputs may be provided for the following parameters, which are merely exemplary: $V_{fuel}$, velocity of fuel entering burner; $V_{PO}$, velocity of primary oxidant entering burner; $M_{fuel}$, mass flow rate of fuel entering burner; $M_{SO}$, mass flow rate of secondary oxidant entering burner; $T_{fuel}$, temperature of fuel entering burner; $T_{PO}$, temperature of primary oxidant entering burner; $P_{SO}$, pressure of secondary oxidant entering burner; $M_{EFF}$ (or $M_{HTF}$), mass flow rate of hot effluent (or heat transfer fluid). Other parameters may be included as inputs, such as burner geometry, and combustion ratio, melt viscosity, and the like.

The term "control", used as a transitive verb, means to verify or regulate by comparing with a standard or desired value. Control may be closed loop, feedback, feed-forward, cascade, model predictive, adaptive, heuristic and combinations thereof. The term "controller" means a device at least capable of accepting input from sensors and meters in real time or near—real time, and sending commands directly to burner control elements, and/or to local devices associated with burner control elements able to accept commands. A controller may also be capable of accepting input from human operators; accessing databases, such as relational databases; sending data to and accessing data in databases, data warehouses or data marts; and sending information to and accepting input from a display device readable by a human. A controller may also interface with or have integrated therewith one or more software application modules, and may supervise interaction between databases and one or more software application modules.

The phrase "PID controller" means a controller using proportional, integral, and derivative features. In some cases the derivative mode may not be used or its influence reduced significantly so that the controller may be deemed a PI controller. It will also be recognized by those of skill in the control art that there are existing variations of PI and PID controllers, depending on how the discretization is performed. These known and foreseeable variations of PI, PID and other controllers are considered within the disclosure.

The controller may utilize Model Predictive Control (MPC). MPC is an advanced multivariable control method for use in multiple input/multiple output (MIMO) systems. MPC computes a sequence of manipulated variable adjustments in order to optimise the future behavior of the process in question. At each control time k, MPC solves a dynamic optimization problem using a model of the controlled system, so as to optimize future behavior (at time k+1, k+2 . . . k+n) over a prediction horizon n. This is again performed at time k+1, k+2 . . . . MPC may use any derived objective function, such as Quadratic Performance Objective, and the like, including weighting functions of manipulated variables and measurements. Dynamics of the process and/or system to be controlled are described in an explicit model of the process and/or system, which may be obtained for example by mathematical modeling, or estimated from test data of the real process and/or system. Some techniques to determine some of the dynamics of the system and/or process to be controlled include step response models, impulse response models, and other linear or non-linear models. Often an accurate model is not necessary. Input and output constraints may be included in the problem formulation so that future constraint violations are anticipated and prevented, such as hard constraints, soft constraints, set point constraints, funnel constraints, return on capital constraints, and the like. It may be difficult to explicitly state stability of an MPC control scheme, and in certain embodiments of the present disclosure it may be necessary to use nonlinear MPC. In so-called advanced control of various systems, PID control may be used on strong mono-variable loops with few or nonproblematic interactions, while one or more networks of MPC might be used, or other multivariable control structures, for strong interconnected loops. Furthermore, computing time considerations may be a limiting factor. Some embodiments may employ nonlinear MPC.

A feed forward algorithm, if used, will in the most general sense be task specific, meaning that it will be specially designed to the task it is designed to solve. This specific design might be difficult to design, but a lot is gained by using a more general algorithm, such as a first or second order filter with a given gain and time constants.

Although only a few exemplary embodiments of this disclosure have been described in detail above, those skilled in the art will readily appreciate that many modifications are possible in the exemplary embodiments without materially departing from the novel teachings and advantages of this disclosure. Accordingly, all such modifications are intended to be included within the scope of this disclosure as defined in the following claims. In the claims, no clauses are intended to be in the means-plus-function format allowed by 35 U.S.C. §112, paragraph 6 unless "means for" is explicitly recited together with an associated function. "Means for" clauses are intended to cover the structures described herein as performing the recited function and not only structural equivalents, but also equivalent structures.

What is claimed is:

1. A submerged combustion method comprising:
   a) flowing an oxidant into a primary annulus between inner and outer conduits of a concentric conduit submerged combustion burner;
   b) flowing a fuel to the inner conduit of the concentric conduit submerged combustion burner;
   c) flowing the oxidant through a plurality of non-central passages in an adjustable removable structure, and the fuel through a central passage in the adjustable removable structure, the adjustable removable structure comprising a body having an upper surface forming a constant angle α with the longitudinal axis, a lower surface, a circumferential surface abutting a portion of an internal surface of the outer conduit, the body including a circumferential lip extension extending away from the upper surface of the body and generally parallel to the longitudinal axis, and a generally cylindrical central hub concentric with a longitudinal axis of the inner conduit, the adjustable removable structure adjustable axially in relation to and removably attached to a first end of the inner conduit via the generally cylindrical central hub, the generally cylindrical central hub defining the central passage having an exit at the upper surface, the body comprising the plurality of non-central passages extending from the lower to the upper surface, the plurality of non-central passages configured such that flow of oxidant through the plurality of non-central passages causes the oxidant to intersect flow of the fuel in a mixing region above the upper surface of the body;
   d) flowing coolant through a secondary annulus external to the primary annulus, the secondary annulus formed by a third substantially concentric conduit comprising a first end, a second end, and an internal surface, the internal surface of the third conduit forming, with an exterior surface of the outer conduit, the secondary annulus, wherein the first end of the third substantially concentric conduit extends beyond a first end of the outer conduit, the first end of the outer conduit extends beyond the first end of the inner conduit, and the secondary annulus is capped by an end cap connecting the first end of the outer conduit and the first end of the third substantially concentric conduit, wherein the end cap is half-torus shaped, the half-torus having an inner diameter equal to an inner diameter of the circumferential lip extension of the body, the diameters configured so that the end cap does not obstruct flow of combustion products out of the burner.

2. The method of claim 1 wherein the oxidant is an oxygen stream comprising at least 90 mole percent oxygen, and the fuel is a gaseous fuel, the gaseous fuel selected from the group consisting of methane, natural gas, liquefied natural gas, propane, carbon monoxide, hydrogen, steam-reformed natural gas, atomized oil or mixtures thereof.

3. A submerged combustion method of producing molten glass comprising:
   a) flowing an oxidant into a primary annulus between inner and outer conduits of a concentric conduit submerged combustion burner;
   b) flowing a fuel to the inner conduit of the concentric conduit submerged combustion burner;
   c) flowing the oxidant through a plurality of non-central oxidant passages in an adjustable, removable structure, and the fuel through a central fuel passage in the adjustable removable structure, the adjustable removable structure comprising a body having an upper surface forming a constant angle α with the longitudinal axis, a lower surface, a circumferential surface abutting a portion of an internal surface of the outer conduit, the body including a circumferential lip extension extending away from the upper surface of the body and generally parallel to the longitudinal axis, and a generally cylindrical central hub concentric with a longitudinal axis of the inner conduit, the adjustable removable structure adjustable axially in relation to and removably attached to a first end of the inner conduit via the generally cylindrical central hub, the generally cylindrical central hub defining the central fuel passage having an exit at the upper surface, the body comprising the plurality of non-central oxidant passages extending from the lower to the upper surface, the plurality of non-central oxidant passages configured such that flow of oxidant through the plurality of non-central oxidant passages causes the oxidant to intersect flow of the fuel in a mixing region above the upper surface of the body;
   d) combusting at least some of the fuel in the mixing region to form a flame and combustion products, the mixing region defined by the upper surface of the body and a burner extension, wherein exits of the plurality of non-central oxidant passages and the exit of the central fuel passage are recessed from an exit of the burner extension;
   e) directing the flame and combustion products into partially molten glass forming materials above the mixing region; and
   f) flowing coolant through a secondary annulus external to the primary annulus, the secondary annulus formed by a third substantially concentric conduit comprising a first end, a second end, and an internal surface, the internal surface of the third conduit forming, with an exterior surface of the outer conduit, the secondary annulus, wherein the first end of the third substantially concentric conduit extends beyond a first end of the outer conduit, the first end of the outer conduit extends beyond the first end of the inner conduit, and the secondary annulus is capped by an end cap connecting the first end of the outer conduit and the first end of the third substantially concentric conduit, wherein the end cap is half-torus shaped, the half-torus having an inner diameter equal to an inner diameter of the circumferential lip extension of the body, the diameters configured so that the end cap does not obstruct flow of combustion products out of the burner.

4. The method of claim 3 wherein the fuel is a gaseous fuel, the gaseous fuel selected from the group consisting of methane, natural gas, liquefied natural gas, propane, carbon monoxide, hydrogen, steam-reformed natural gas, atomized oil or mixtures thereof, and the oxidant is an oxygen stream comprising at least 90 mole percent oxygen.

5. A submerged combustion method comprising:
   a) flowing a fuel into a primary annulus between inner and outer conduits of a concentric conduit submerged combustion burner;
   b) flowing an oxidant to the inner conduit of the concentric conduit submerged combustion burner;
   c) flowing the fuel through a plurality of non-central passages in an adjustable removable structure, and the oxidant through a central passage in the adjustable removable structure, the adjustable removable structure comprising a body having an upper surface forming a constant angle α with the longitudinal axis, a lower surface, a circumferential surface abutting a portion of an internal surface of the outer conduit, the body including a circumferential lip extension extending away from the upper surface of the body and generally parallel to the longitudinal axis, and a generally cylindrical central hub concentric with a longitudinal axis of the inner conduit, the adjustable removable structure adjustable axially in relation to and removably attached to a first end of the inner conduit via the generally cylindrical central hub, the generally cylindrical central hub defining the central passage having an exit at the upper surface, the body comprising the plurality of non-central passages extending from the lower to the upper surface, the plurality of non-central passages configured such that flow of fuel through the plurality of non-central passages causes the oxidant to intersect flow of the oxidant in a mixing region above the upper surface of the body;

d) flowing coolant through a secondary annulus external to the primary annulus, the secondary annulus formed by a third substantially concentric conduit comprising a first end, a second end, and an internal surface, the internal surface of the third conduit forming, with an exterior surface of the outer conduit, the secondary annulus, wherein the first end of the third substantially concentric conduit extends beyond a first end of the outer conduit, the first end of the outer conduit extends beyond the first end of the inner conduit, and the secondary annulus is capped by an end cap connecting the first end of the outer conduit and the first end of the third substantially concentric conduit, wherein the end cap is half-torus shaped, the half-torus having an inner diameter equal to an inner diameter of the circumferential lip extension of the body, the diameters configured so that the end cap does not obstruct flow of combustion products out of the burner.

6. The method of claim 5 wherein the oxidant is an oxygen stream comprising at least 90 mole percent oxygen, and the fuel is a gaseous fuel, the gaseous fuel selected from the group consisting of methane, natural gas, liquefied natural gas, propane, carbon monoxide, hydrogen, steam-reformed natural gas, atomized oil or mixtures thereof.

7. A submerged combustion method of producing molten glass comprising:
 a) flowing a fuel into a primary annulus between inner and outer conduits of a concentric conduit submerged combustion burner;
 b) flowing an oxidant to the inner conduit of the concentric conduit submerged combustion burner;
 c) flowing the fuel through a plurality of non-central fuel passages in an adjustable removable structure, and the oxidant through a central oxidant passage in the adjustable removable structure, the adjustable removable structure comprising a body having an upper surface forming a constant angle α with the longitudinal axis, a lower surface, a circumferential surface abutting a portion of an internal surface of the outer conduit, the body including a circumferential lip extension extending away from the upper surface of the body and generally parallel to the longitudinal axis, and a generally cylindrical central hub concentric with a longitudinal axis of the inner conduit, the adjustable removable structure adjustable axially in relation to and removably attached to a first end of the inner conduit via the generally cylindrical central hub, the generally cylindrical central hub defining the central oxidant passage having an exit at the upper surface, the body comprising the plurality of non-central fuel passages extending from the lower to the upper surface, the plurality of non-central fuel passages configured such that flow of fuel through the plurality of non-central fuel passages causes the fuel to intersect flow of the oxidant in a mixing region above the upper surface of the body;
 d) combusting at least some of the fuel in the mixing region to form a flame and combustion products, the mixing region defined by the upper surface of the body and a burner extension, wherein exits of the plurality of non-central fuel passages and the exit of the central oxidant passage are recessed from an exit of the burner extension;
 e) directing the flame and combustion products into partially molten glass forming materials above the mixing region; and
 f) flowing coolant through a secondary annulus external to the primary annulus, the secondary annulus formed by a third substantially concentric conduit comprising a first end, a second end, and an internal surface, the internal surface of the third conduit forming, with an exterior surface of the outer conduit, the secondary annulus, wherein the first end of the third substantially concentric conduit extends beyond a first end of the outer conduit, the first end of the outer conduit extends beyond the first end of the inner conduit, and the secondary annulus is capped by an end cap connecting the first end of the outer conduit and the first end of the third substantially concentric conduit, wherein the end cap is half-torus shaped, the half-torus having an inner diameter equal to an inner diameter of the circumferential lip extension of the body, the diameters configured so that the end cap does not obstruct flow of combustion products out of the burner.

8. The method of claim 7 wherein the fuel is a gaseous fuel, the gaseous fuel selected from the group consisting of methane, natural gas, liquefied natural gas, propane, carbon monoxide, hydrogen, steam-reformed natural gas, atomized oil or mixtures thereof, and the oxidant is an oxygen stream comprising at least 90 mole percent oxygen.

\* \* \* \* \*